United States Patent
Brodigan

(10) Patent No.: US 6,530,086 B1
(45) Date of Patent: Mar. 4, 2003

(54) SYSTEM AND METHOD FOR VDSL REAL TIME RESPONSE TO VIDEO PROGRAMMING

(75) Inventor: Donald L. Brodigan, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/323,370

(22) Filed: Jun. 1, 1999

(51) Int. Cl.[7] ............................................. H04N 7/173
(52) U.S. Cl. ......................... 725/95; 725/104; 725/109
(58) Field of Search ............................... 709/217, 219; 345/327; 348/12, 13, 10, 6, 906; 455/3.1, 5.1, 6.2; 725/95, 96, 93, 104, 109, 110; 370/329, 341, 431, 437, 230; G06F 15/16; H04N 7/10, 7/14, 7/173

(56) References Cited

U.S. PATENT DOCUMENTS

| | | | | | |
|---|---|---|---|---|---|
| 4,876,592 A | * | 10/1989 | Von Kohorn | ................ | 725/23 |
| 5,012,466 A | * | 4/1991 | Buhrke et al. | .............. | 370/270 |
| 5,067,123 A | * | 11/1991 | Hyodo et al. | ............... | 370/396 |
| 5,367,329 A | * | 11/1994 | Nakagaki et al. | .............. | 725/1 |
| 5,541,917 A | * | 7/1996 | Farris | ......................... | 370/352 |
| 5,583,864 A | * | 12/1996 | Lightfoot et al. | ........... | 370/396 |
| 5,589,892 A | * | 12/1996 | Knee et al. | ................. | 348/906 |
| 5,696,765 A | * | 12/1997 | Safadi | ........................ | 370/436 |
| 5,757,798 A | * | 5/1998 | Hamaguchi | ................. | 370/397 |
| 5,790,173 A | | 8/1998 | Strauss et al. | | |
| 5,801,747 A | * | 9/1998 | Bedard | ........................ | 348/10 |
| 5,850,218 A | * | 12/1998 | LaJoie et al. | ............... | 345/327 |
| 5,856,975 A | | 1/1999 | Rostoker et al. | | |
| 5,915,243 A | * | 6/1999 | Smolen | ....................... | 705/14 |
| 5,940,073 A | * | 8/1999 | Klosterman et al. | ........ | 345/327 |
| 5,978,855 A | * | 11/1999 | Metz et al. | ................. | 709/249 |
| 5,999,563 A | | 12/1999 | Polley et al. | | |
| 6,002,394 A | * | 12/1999 | Schein et al. | ............... | 345/327 |
| 6,070,243 A | * | 5/2000 | See et al. | .................... | 713/201 |

* cited by examiner

Primary Examiner—Andrew Faile
Assistant Examiner—Vivek Srivastava
(74) Attorney, Agent, or Firm—Brooks & Kushman, P.C.

(57) ABSTRACT

An upstream signaling arrangement for a VDSL network is provided which uses a head end data carousal to send an IP address of a programming host computer to end user set top boxes. The IP address is assigned to a specific program channel and broadcast time. Two-way communication is achieved over the VDSL network by using a set top box ATM IPPV to send and receive upstream information to the program provider via the IP address. The IP address allows the head end to relay the signals to and from the program host computer anywhere in the world using an Internet connection. This arrangement advantageously allows an end user to respond in real time to messages being received from an external programming host during the specific program.

16 Claims, 2 Drawing Sheets

SYSTEM AND METHOD FOR VDSL REAL TIME RESPONSE TO VIDEO PROGRAMMING

TECHNICAL FIELD

The present invention generally relates to broadband hybrid fiber coax (HFC) communication systems, and more particularly to an improved upstream signaling arrangement to allow real-time end user response to an external program host server.

BACKGROUND ART

Generally hybrid fiber coaxial (HFC) communication networks use a combination of fiber optic and coaxial cable architectures to enable distribution of video and data programming and services to customer end user locations. Such systems take advantage of the already existing CATV coaxial plant extending to the end user location, while also utilizing the improved signal quality and processing that a fiber optic plant can provide in connecting the coaxial plant to one or more outside service providers, such as video information providers (VIPs) and data service providers (DSPs). Such networks use a head end to act as a central hub between the end users and the VIPs/DSPs.

While such networks have provided a significant improvement to traditional CATV systems by allowing integration of both video and data capabilities and increasing available programming options, to date, conventional HFC networks have been limited in their ability to accommodate upstream signaling from an end user to an individual program service provider. Such upstream signaling is required for example with pay-per-view type (PPV) program selection. In conventional HFC networks, such upstream signaling capability is provided separate from the video programming distribution network such as by using a landline telephone network (POTS) for the return path. For example, a user either telephons a designated service number and manually orders the desired programming, or was provided with a set top box (STB) having a dedicated built-in modem for communicating impulse PPV (IPPV) signaling over the POTS to the service provider.

The required use of a communication architecture separate from the video programming network prevents conventional HFC networks from providing real-time response capability for end users to select programming or make other on-line order purchases associated with the distributed video programming. In addition, the use of a separate communication architecture makes it very difficult for a service provider to verify that the services/goods being purchased by the end user receiving the services/goods. Still further, the use of the telephone lines requires added expense for the service provider such as due to additional overhead from paying for toll-free numbers, and requires convenient access to a telephone line for the end user.

In addition to conventional HFC networks, digital communication system are being developed and deployed which use Digital Subscriber Line signal architectures, generally denoted as xDSL, to allow digital distribution of combined broadband video and data services with traditional narrow-band voice transmissions over hybrid cabling plants. One form of xDSL of particular interest to the present invention is VDSL (Very high speed Digital Subscriber Line), which is a packet-based transmission architecture used to provide extremely high bandwidth distribution of digital video and data signals to customer buildings. A VDSL-based architecture can advantageously provide a single platform for supporting bandwidth-intensive applications, such as Internet access, remote LAN access, video conferencing, and video-on-demand.

VDSL based services are typically implemented in an asymmetric form having a downstream transmission capability of about 52 Mbps over twisted pair copper wire arranged in local loops of 300 m, 26 Mbps at 1,000 m, and 13 Mbps at 1,500 m. Upstream data rates in asymmetric implementations tend to range from about 1.6 Mbps to about 2.3 Mbps. A typical distribution system includes a central office equipped with a broadband digital terminal (BDT) and arranged to operate as a hub between multiple video information providers (VIPs)/digital service providers (DSPs) and customer residential dwellings. In a fiber-to-the-neighborhood (FTTN) type distribution system, optic fiber (e.g. OC-3c and OC-12c) lines are used to connect the central office to a universal system access multiplexer (USAM), which is then connected to a network interface device (NID) located on the customer property via twisted pair copper wire. A dedicated VDSL loop extends between the NID and an individual customer residence using an existing POTS or telephone system twisted pair wire, and a customer interface device, such as a residential gateway or set top box, provides a connection point for a customer television or personal computer. A fiber-to-the-curb (FTTC) type distribution system is similar except that a broadband network unit (BNU) is used in place of the USAM, and coaxial cable is used to connect the BNU, NID, and set top box.

The VDSL signal format is used to carry signals to and from the customer. In these systems, a head end or central office utilizes a data carousel to continually unicast data such as software upgrades, general information, and an electronic program guide (EPG) downstream to the end users' set top boxes. To date, a truly satisfactory two-way communication arrangement has yet to be developed for such a VDSL-based network architecture. Therefore, a need exists for an upstream signaling arrangement which can take advantage of the digital architecture of a VDSL-based network, while overcoming the above-noted deficiencies with existing HFC networks.

DISCLOSURE OF INVENTION

Therefore, it is an object of the present invention to provide a system and method for real time upstream response between a customer set top box and an external program host provider in a VDSL network.

It is another object of the present invention to provide a system and method for real time upstream response in a VDSL network between a customer set top box and an external program host provider that does not require access to telephone lines or charges.

It is yet another object of the present invention to provide a system and method for real time upstream response in a VDSL network between a customer set top box and an external program host provider that is secure and allows detailed tracking and record keeping of such responses.

It is still a further object of the present invention to provide a system and method for real time upstream response between a customer set top box and an external program host provider in a VDSL network that utilizes a network data carousel to communicate host server IP addresses to end users for return communication.

In accordance with these and other objects, the present invention provides a system for upstream signaling to allow real-time end user response to an external program service provider in a VDSL-based communication network. The system utilizes a network head end having a data carousel for down loading data on a VDSL distribution system for broadcast to an end user location. The network head end is arranged to receive an IP address from the external program service provider and associate the IP address with a specific program channel and time of broadcast. A transceiver device is connected to the network at the end user location and is arranged to receive the down loaded data. The head end assigns an impulse pay-per-channel ATM virtual path/channel ID to the transceiver unit after the transceiver device signs on to the network. The transceiver includes an application interface that can be launched by the end user to initiate an upstream response to the external program service provider. The application interface is arranged to send a response to the received IP address using the assigned impulse pay-per-channel ATM virtual path/channel ID when the transceiver is tuned to the associated program during the broadcast time. The head end then forwards the response to the designated IP address.

In accordance with another aspect of the present invention, a method is provided for upstream signaling to allow real-time end user response to an external program service provider in a VDSL-based communication network. The method includes receiving an IP address from the external program service provider at a network head end, associating the IP address with a specific program channel and time of broadcast, and down loading the IP address as part of a network data carousel broadcast on a VDSL distribution system to an end user location. An impulse pay-per-channel ATM virtual path/channel ID is assigned to a transceiver device connected to the network at an end user location after the transceiver device signs on to the network. The IP address is received at a transceiver device, and an upstream response is generated for the external program service provider when the transceiver is tuned to the associated program during the broadcast time. The response is sent to the received IP address using the assigned impulse pay-per-channel ATM virtual path/channel ID, and the response is forwarded from the head end to the designated IP address.

In accordance with other features of the present invention, the system and method provide including the IP address as part of an electronic program guide broadcast by the data carousel. Messages from the external program service provider are displayed on a portion of a video screen at the user location during the associated program broadcast time if the transceiver is tuned to the program channel. In addition, a connect message is sent to the received IP address to initiate a network connected two-way communication session between the external program service provider and the end user. The two-way session is terminated by the application interface if the user changes the channel being viewed, or at the end of the broadcast time.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
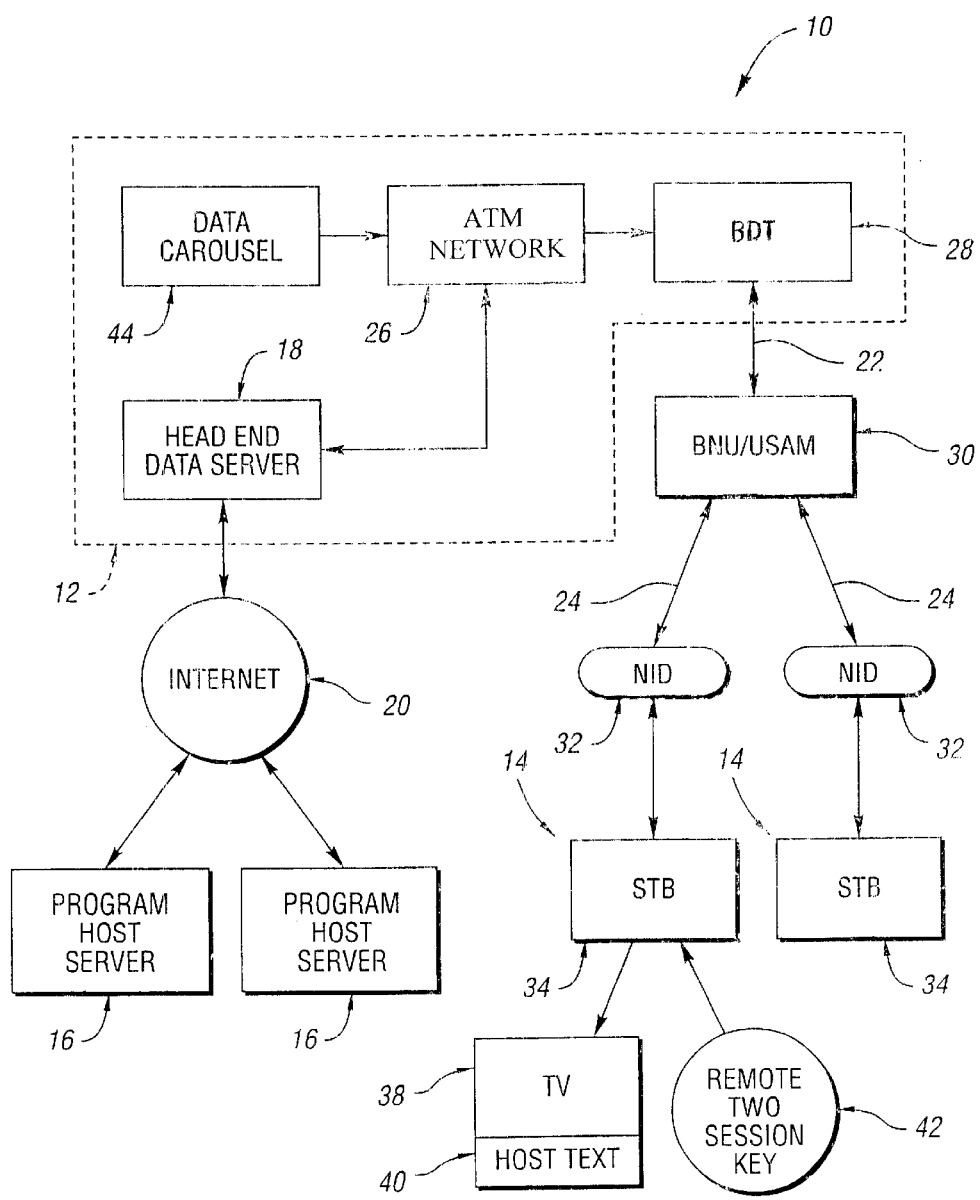
FIG. 1 is a block diagram of a VDSL-based communication system including the network two-way communication arrangement in accordance with an exemplary embodiment of the present invention.

Referring to FIG. 1, a VDSL communication network in accordance with an exemplary embodiment of the present invention is generally indicated at 10 and includes a head end/central office 12 connected to one or more outside multi-media type service providers and arranged to operate as a network hub for redistributing received signals between the outside service providers and one or more customer sites 14. For example, video signals are provided from an outside video information provider (VIP), and digital data signals are received from an outside data service provider (DSP). Each outside service provider includes a program host server 16 connected to a data server 18 located in the head end via an Internet connection 20. The head end processes the received signals for retransmission by an VDSL transmission unit onto a distribution line formed from a fiber optic cable 22 and a twisted pair copper cable 24. The head end further includes appropriate MPEG encoder/decoder circuitry and a multiplexer arrangement (not shown) for supporting transmission of VDSL formatted signals on cable 22. It is noted that while the exemplary embodiment of the present invention is described in connection with a VDSL-based system, the present invention can be employed using any type of xDSL format.

The combined signals are preferably transmitted using an asynchronous transfer mode (ATM) protocol on an ATM network 26 located in the head end. Such a protocol requires ATM framing of the signals to include a timing signal used by a receiving unit decoder to decode the signal payload. Examples of suitable fiber optic cable 22 include OC3c or OC12c cable, while twisted-pair cable 24 is preferably implemented using Category (CAT) 5 twisted copper pair wire.

At the head end, the ATM network is coupled to host digital terminal (BDT) 28 which is operative to maintain control over signals sent to the customer cites by via a customer access/entitlement right profile stored in the BDT. Such a profile can be maintained as a database of MAC addresses assigned to certain rights. To have programming rights, a customer drop must be properly provisioned or authorized by the head end. The BDT is coupled to at least one USAM or BNU 30 located near a customer site via cable 22. As noted previously, a USAM is used in a FTTN type network configuration, while a BNU is used in a FTTC type network configuration. More specifically, a USAM is located near the customer site within 4,000 feet (≈1220 m) of a central point of connection network interface device (NID) 32 located at each customer site. A BNU is typically located deeper in the network, such as within 150 feet of the customer building. The USAM or BNU are arranged to operate as a single platform for voice, video, and data signals.

A set top box (STB) 34 is connected to the NID within each customer site. STB 34 further includes at least one data port such as an 10baseT Ethernet port (not shown) to allow connection to personal computer, and at least one MPEG2 video decoder port 36 to allow connection to a television (or other video display device) 38. As described below, when connected, a host server 16 can send messages that are displayed on a particular area 40 of the image displayed on TV 38. As also described below, each STB in accordance with the present invention further includes a two-way session initiation key 42. Key 42 can be arranged as a pre-defined key located on a remote control unit (not shown).

Head end 12 further includes a data carousel 44. Data carousel 44 is arranged to continually unicast data such as software upgrades, general information, and an electronic program guide (EPG) downstream to set top boxes 34. All signaling on the data carousel/STB path and head end data server/STB paths is carried out using ATM.

Head end data server 18 is arranged to assign a two-way IPPV virtual path ID (VPI)/virtual channel ID (VCI) to a STB when the STB signs onto the network. Each STB is provided with an application interface (API) arranged to direct upstream signals to head end data server 18 on the assigned IPPV VPI/VCI. The API is implemented using known programming techniques as a software program loaded into a microprocessor system in the STB.

In further accordance with the present invention, data carousel 44 is arranged to include an IP address provided by each program host server 16 as well as information regarding channel and hour of program associated with a particular IP address. In other words, the IP address forms part of the EPG data down loaded from the carousel to STB, and is specific to a channel program at a specific time interworking with the API in the STB.

When initiated by a user, the API in the STB utilizes the IP address in the IPPV ATM permanent virtual channel (PVC) to direct upstream signals to the head end. The head end process the IP address to forward the signal to the program host server. The program host server can then return messages which are forwarded to the STB as long as it is tuned to program host server's channel and the STB API still enabled for two-way communication.

In accordance with the present invention, the API is arranged to automatically terminate a current two-way session any time the user changes to another channel or if the program is complete. In addition, security can be included by arranging the STB API to only accept data back from the program host IP address.

In a normal mode, a program host server will multicast most information to all users on the VDSL network to be displayed in TV screen area 40 using the STB API. The user can respond to messages displayed on the screen using a remote control unit. In addition, a program host server has the ability if desired to communicate directly with a particular user during that program time if the user is enabled in a two-way session mode. For example, if a user wants to make a purchase while a program is in progress, billing and shipping information may need to be requested from the user. Such information can be programmed into the API for automatic encryption and transmission when prompted, or negotiated in response to a telephone number sent over the line to the purchaser's TV. A user can terminate and restart the API for that channel if tuned to that channel during the proper broadcast time.

Figure 2:
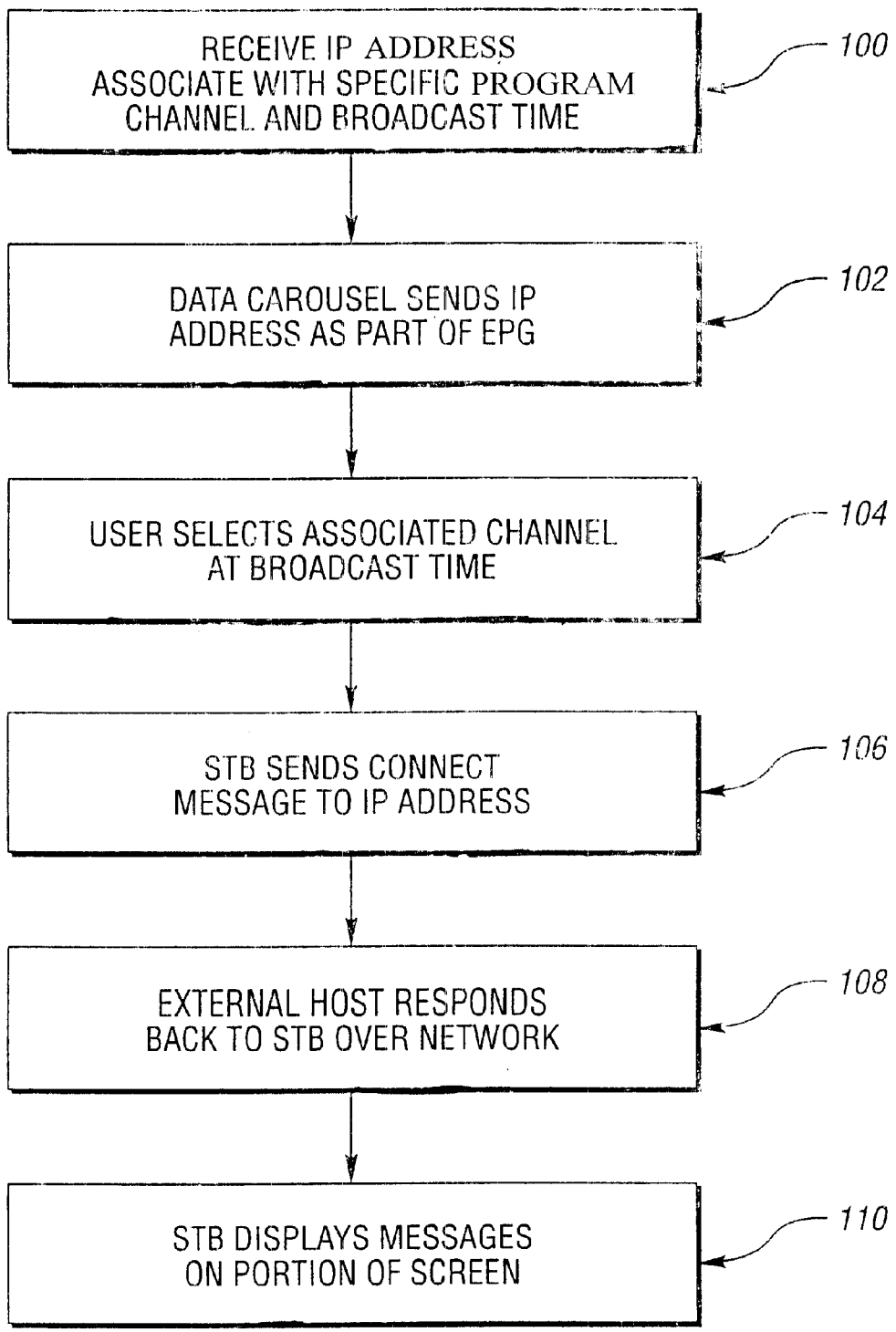
FIG. 2 is flow chart showing the overall real upstream enabling process of the present invention.

Referring now to the flow chart in FIG. 2, the overall process for initiating a two-way communication session will now be described. More specifically, as denoted at block 100, an IP address is received from a particular external program host server and associated with a particular program on a specific channel and program time. The data carousel then unicasts to all users the IP address as part of its EPG down load as indicated at block 102. As designated at block 104, the user selects the associated channel at the program time and presses the pre-defined key on the remote control unit to run the STB API. AT block 106, the STB sends a connect message to the program host server IP address received in the EPG. The host server responds back to the STB at block 108, and the STB causes the response message to be displayed the pre-defined portion of the TV screen at block 110. Two-way upstream and downstream signaling are now established between the program host and the STB over the network until terminated.

Thus, the present invention provides an upstream signaling arrangement in a VDSL network which uses a head end data carousal to send an IP address of a programming host computer that is assigned to a specific program channel and time to a customer STB. Two-way communication is achieved over the network by using the STB ATM IPPV to send and receive upstream information to the program provider via the IP address. The IP address allows the head end to relay the signals to and from the program host computer anywhere in the world using an Internet connection. The data carousal, STB API, IPPV ATM VPI/VCI and the connection of the head end data server of the present invention allow a user to generate real time, i.e., contemporaneous with the displayed programming, VDSL upstream signaling to a program host provider. In addition, because the signaling occurs over the network, customer signals can be tracked and recorded, the present invention can associate purchase orders as originating from a specific household, thereby deterring fraud and misrepresentation by customers.

While the best mode for carrying out the invention has been described in detail, those familiar with the art to which this invention relates will recognize various alternative designs and embodiments for practicing the invention as defined by the following claims.

What is claimed is:

1. A system for upstream signaling to allow real-time end user response to an external program service provider in a VDSL-based communication network, the system comprising:

a network head end having a data carousel for down loading data on a VDSL distribution system for broadcast to an end user location, said network head end arranged to receive an IP address from the external program service provider and associate the IP address with a specific program channel and time of broadcast; and a transceiver device connected to the network at the end user location and arranged to receive the down loaded data, said head end assigning an impulse pay-per-channel ATM virtual path/channel ID to the transceiver unit after the transceiver device signs on to the network, and said transceiver including an application interface that can be launched by the end user to initiate an upstream response to the external program service provider, wherein the application interface is arranged to send a response to the received IP address using the assigned impulse pay-per-channel ATM virtual path/channel ID when the transceiver is tuned to the associated program during the broadcast time, and the head end is arranged to forward the response to the designated IP address.

2. The system of claim 1 wherein the transceiver device comprises a user set top box.

3. The system of claim 1 wherein the data carousel is operative to include the IP address as part of an electronic program guide.

4. The system of claim 1 wherein the application interface is operative to display messages from the external program service provider on a portion of a video screen during the associated program broadcast time if the transceiver is tuned to the program channel.

5. The system of claim 1 wherein the application interface is operative to send a connect message to the received IP address when the application interface is launched to initiate a network connected two-way communication session between the external program service provider and the end user.

6. The system of claim 5 wherein the application interface is arranged to terminate the two-way session if the user changes the channel being viewed.

7. The system of claim 5 wherein the application interface is arranged to terminate the two-way session at the end of the broadcast time.

8. The system of claim 1 further comprising a user command button for generating a command to launch the application interface.

9. The system of claim 8 wherein the user command button comprises a key on a remote control unit.

10. A method for upstream signaling to allow real-time end user response to an external program service provider in a VDSL-based communication network, the method comprising:

receiving an IP address from the external program service provider at a network head end, associating the IP address with a specific program channel and time of broadcast;

down loading the IP address as part of a network data carousel broadcast on a VDSL distribution system to an end user location, assigning an impulse pay-per-channel ATM virtual path/ channel ID to a transceiver device connected to the network at an end user location after the transceiver device signs on to the network, receiving the IP address at a transceiver device;

generating an upstream response to the external program service provider when the transceiver is tuned to the associated program during the broadcast time, sending the response to the received IP address using the assigned impulse pay-per-channel ATM virtual path/ channel ID, and forwarding the response from the head end to the designated IP address.

11. The method of claim 10 further comprising including the IP address as part of an electronic program guide broadcast by the data carousel.

12. The method of claim 10 further comprising displaying messages from the external program service provider on a portion of a video screen during the associated program broadcast time if the transceiver is tuned to the program channel.

13. The method of claim 10 further comprising sending a connect message to the received IP address to initiate a network connected two-way communication session between the external program service provider and the end user.

14. The method of 13 further comprising terminating the two-way session if the user changes the channel being viewed.

15. The method of claim 13 further comprising terminating the two-way session via an end user application interface at the end of the broadcast time.

16. The method of claim 10 further comprising generating the end user response by actuating a command button.

* * * * *